US009485192B2

(12) United States Patent
Antich

(10) Patent No.: US 9,485,192 B2
(45) Date of Patent: Nov. 1, 2016

(54) SELECTABLE SERVICE NODE RESOURCES

(71) Applicant: Juniper Networks, Inc., Sunnyvale, CA (US)

(72) Inventor: Javier Antich, Valencia (ES)

(73) Assignee: Juniper Networks, Inc., Sunnyvale, CA (US)

( * ) Notice: Subject to any disclaimer, the term of this patent is extended or adjusted under 35 U.S.C. 154(b) by 98 days.

(21) Appl. No.: 14/251,323

(22) Filed: Apr. 11, 2014

(65) Prior Publication Data

US 2015/0271102 A1 Sep. 24, 2015

(30) Foreign Application Priority Data

Mar. 21, 2014 (EP) .................................... 14382099

(51) Int. Cl.
*H04L 12/911* (2013.01)
*H04L 12/723* (2013.01)
*H04L 12/927* (2013.01)
*H04L 29/12* (2006.01)

(52) U.S. Cl.
CPC .......... *H04L 47/825* (2013.01); *H04L 45/507* (2013.01); *H04L 47/781* (2013.01); *H04L 47/805* (2013.01); *H04L 61/203* (2013.01)

(58) Field of Classification Search
None
See application file for complete search history.

(56) References Cited

U.S. PATENT DOCUMENTS

| 7,184,437 | B1 | 2/2007 | Cole et al. |
| 7,519,735 | B1* | 4/2009 | Ju ........................... H04L 45/00 709/238 |
| 8,094,575 | B1 | 1/2012 | Vadlakonda et al. |
| 8,369,345 | B1* | 2/2013 | Raghunathan .......... H04L 45/60 370/397 |
| 8,571,029 | B1 | 10/2013 | Aggarwal et al. |
| 8,675,488 | B1 | 3/2014 | Sidebottom et al. |
| 8,675,664 | B1 | 3/2014 | Kamath et al. |
| 2005/0102393 | A1* | 5/2005 | Murray ................... H04L 29/06 709/224 |

(Continued)

FOREIGN PATENT DOCUMENTS

WO 2013184846 A1 12/2013

OTHER PUBLICATIONS

Search Report from Counterpart European Patent Application No. 14382099.1, dated Sep. 11, 2014, 7 pp.

(Continued)

*Primary Examiner* — Derrick Ferris
*Assistant Examiner* — Jay Vogel
(74) *Attorney, Agent, or Firm* — Shumaker & Sieffert, P.A.

(57) ABSTRACT

In one example, a method includes receiving, by a service node, a request from an access node to establish a pseudowire to be used for sending subscriber traffic to the service node for application of services to the subscriber traffic at the service node, and, in response to receiving the request, sending a request message from the service node to a central server requesting both subscriber authentication and assignment of a forwarding component of the service node to which to anchor the pseudowire. The method also includes receiving, by the service node and from the central server, an authentication message in response to the request message, wherein the authentication message confirms subscriber authentication and indicates a forwarding component of the service node to which the service node should anchor the pseudowire.

28 Claims, 7 Drawing Sheets

(56) References Cited

U.S. PATENT DOCUMENTS

| | | | | |
|---|---|---|---|---|
| 2007/0165622 | A1* | 7/2007 | O'Rourke | H04L 12/287 370/389 |
| 2008/0044181 | A1 | 2/2008 | Sindhu | |
| 2008/0253381 | A1* | 10/2008 | Ward | H04L 45/10 370/396 |
| 2010/0217882 | A1* | 8/2010 | Yang | H04L 12/4633 709/229 |
| 2010/0291943 | A1* | 11/2010 | Mihaly | H04L 29/12066 455/450 |
| 2011/0126041 | A1* | 5/2011 | Matsubara | H04L 45/22 714/4.11 |
| 2012/0144066 | A1* | 6/2012 | Medved | H04L 45/02 709/242 |
| 2013/0003740 | A1* | 1/2013 | Zheng | H04L 12/66 370/392 |
| 2013/0336192 | A1* | 12/2013 | Zhao | H04L 45/16 370/312 |
| 2014/0153574 | A1* | 6/2014 | Louzoun | H04L 1/188 370/392 |
| 2015/0092776 | A1* | 4/2015 | Wijnands | H04L 45/507 370/392 |

OTHER PUBLICATIONS

Aggarwal et al., "MPLS Upstream Label Assignment and Context-Specific Label Space," Network Working Group, RRC 5331, Aug. 2008, 14 pp.

Andersson et al., "LDP Specification," RFC 5036, Oct. 2007, 135 pp.

Gredler et al., "Advertising Link-State Information in BGP," Inter-Domain Routing Internet-Draft, draft-gredler-bgp-to-01, Jul. 2011, 25 pp.

Leymann et al., "Seamless MPLS Architecture: draft-ietf-mpls-seamless-mpls-02," MPLS Working Group, Internet-Draft, Oct. 22, 2012, 43 pp.

Rigney et al., "Remote Authentication Dial in User Server (RADIUS)," Network Working Group of the Internet Engineering Task force (IETF), Request for Comments 2865, Jun. 2000, 76 pp.

Rosen et al., "Multiprotocol Label Switching Architecture," Network Working Group, RFC 3031, Jan. 2001, 57 pp.

Response to Examination Report dated Sep. 11, 2014, from counterpart European Application No. 14382099.1, filed Mar. 1, 2016, 31 pp.

* cited by examiner

SELECTABLE SERVICE NODE RESOURCES

This application claims priority to European Patent Application No. EP14382099.1, filed Mar. 21, 2014, the entire contents of which are incorporated by reference herein.

TECHNICAL FIELD

The disclosure relates to packet-based computer networks and, more particularly, to forwarding packets within computer networks.

BACKGROUND

A computer network is composed of a set of nodes and a set of links that connect one node to another. For instance, a computer network may be composed of a set of routers while the set of links may be cables between the routers. When a first node in the network sends a message to a second node in the network, the message may pass through many links and many nodes. The links and nodes the message passes through while traveling from the first node to the second node is referred to as a path.

Packet-based computer networks increasingly utilize label switching protocols for traffic engineering and other purposes. In a label switching network, label switching routers (LSRs) use Multi-Protocol Label Switching (MPLS) signaling protocols to establish label switched paths (LSPs). The LSRs utilize MPLS protocols to receive MPLS label mappings from downstream LSRs and to advertise MPLS label mappings to upstream LSRs. When an LSR receives an MPLS packet from an upstream router, it switches the MPLS label according to the information in its forwarding table and forwards the packet to the appropriate downstream LSR.

MPLS can be deployed in core and aggregation network and provides a mature and stable basis for large networks. MPLS can also be used in access networks, e.g. such as mobile or Digital Subscriber Line (DSL) backhaul networks. MPLS is used on two different layers: the Transport Layer and the Service Layer (e.g., for MPLS virtual private networks (VPNs)). In both cases, the protocols and the encapsulation are identical, but the use of MPLS is different especially concerning the signaling, the control plane, the provisioning, the scalability and the frequency of updates. On the service layer, only service specific information is exchanged, and every service can potentially deploy its own architecture and individual protocols. The services run on top of the transport layer.

A Seamless MPLS network is a network in which all forwarding of packets within the network, from the time a packet enters the network until it leaves the network, is done based on MPLS. The motivation of Seamless MPLS is to provide an architecture which supports a wide variety of different services on a single MPLS platform fully integrating access, aggregation and core network. The architecture can be used for residential services, mobile backhaul, business services and supports fast reroute, redundancy and load balancing. Seamless MPLS provides the deployment of service creation points which can be virtually everywhere in the network, enabling network and service providers with a flexible service and service creation. Service creation can be done based on the existing requirements without the needs for dedicated service creation areas on fixed locations. With the flexibility of Seamless MPLS, the service creation can be done anywhere in the network and easily moved between different locations.

SUMMARY

In general, this disclosure describes techniques for providing dynamically selectable service resources in a network. For example, service nodes can expose their service resources and capabilities, including the level of utilization of those service resources, to other devices in a network by sending service resource information to a central data repository. In one example, a routing protocol is extended to allow for advertising the service resource information via route update messages. In addition, service nodes can update this information by sending further update messages as the service resources are consumed or released. In some examples, a central server device can determine which service resource to assign to a requesting network device. Whichever network element is configured to make decisions based on the service selection database has access to that information and can make the appropriate choices, such as selecting which service node to use for a session with the access node, which PFE within a service node to use for anchoring a pseudowire with an access node, which service node to use as backup if backup is needed, or which PFE to use as backup, for example.

In one example aspect, a method includes receiving, by a service node, a request from an access node to establish a pseudowire to be used for sending subscriber traffic from the access node to the service node for application of services to the subscriber traffic at the service node, and, in response to receiving the request, sending a request message from the service node to a central server requesting both subscriber authentication and assignment of a forwarding component of the service node to which to anchor the pseudowire. The method also includes receiving, by the service node and from the central server, an authentication message in response to the request message, wherein the authentication message confirms subscriber authentication and indicates a forwarding component of the service node to which the service node should anchor the pseudowire, in response to receiving the authentication message, automatically establishing the pseudowire between the access node and the service node, and anchoring the pseudowire to the forwarding component indicated by the authentication message.

In another example aspect, a method includes receiving, at a central server, a request from a network device requesting both subscriber authentication and assignment of one of a plurality of service nodes in a network to which to establish a targeted label distribution protocol (LDP) session between an access node and the assigned one of the plurality of service nodes for transporting subscriber traffic, and, in response to receiving the request and by the central server, assigning a service node based on a service selection database containing service resource information associated with the plurality of service nodes. The method also includes outputting an authentication message from the central server to the requesting network device in response to the request message, wherein the authentication message confirms subscriber authentication and indicates the assigned service node.

In another example aspect, a service node network device includes a hardware-based processor; an interface operable to receive a request from a network device requesting both subscriber authentication and assignment of one of a plurality of service nodes in a network to which to establish a targeted label distribution protocol (LDP) session between an access node and the assigned one of the plurality of service nodes for transporting subscriber traffic, a service resource module operable by the processor to, in response to receiving the request, assign a service node based on a service selection database containing service resource information associated with the plurality of service nodes, and an authorization module operable by the processor to output an authentication message from the central server to the requesting network device in response to the request message, wherein the authentication message confirms subscriber authentication and indicates the assigned service node.

In a further example aspect, a central server includes a hardware-based processor, an interface operable to receive a request from a network device requesting both subscriber authentication and assignment of one of a plurality of service nodes in a network to which to establish a targeted label distribution protocol (LDP) session between an access node and the assigned one of the plurality of service nodes for transporting subscriber traffic, and a service resource module operable by the processor to, in response to receiving the request, assign a service node based on a service selection database containing service resource information associated with the plurality of service nodes. The central server further includes an authorization module operable by the processor to output an authentication message from the central server to the requesting network device in response to the request message, wherein the authentication message confirms subscriber authentication and indicates the assigned service node.

In a further example aspect, a computer-readable storage medium includes instructions for causing a programmable processor to receive a request at a service node from an access node to establish a pseudowire to be used for sending subscriber traffic from the access node to the service node for application of services to the subscriber traffic at the service node, and, in response to receiving the request, send a request message from the service node to a central server requesting both subscriber authentication and assignment of a forwarding component of the service node to which to anchor the pseudowire. The computer-readable storage medium further includes instructions for causing the programmable processor to receive, from the central server, an authentication message in response to the request message, wherein the authentication message confirms subscriber authentication and indicates a forwarding component of the service node to which the service node should anchor the pseudowire, in response to receiving the authentication message, automatically establish the pseudowire between the access node and the service node, and anchor the pseudowire to the forwarding component indicated by the authentication message.

The techniques of this disclosure may provide one or more advantages. For example, in some example aspects the techniques described herein can allow access nodes and service nodes to leverage the authorization process performed between themselves and a central server, to obtain intelligent assignment of service resources.

The techniques of this disclosure can also allow for automating the process of establishing the connectivity between an access node and the determined service node, after the service allocation decision has taken place. Many auto-detection or auto-creation features have been developed to ensure that no subscriber or service configuration is required, such that service nodes (e.g., Broadband Network Gateways (BNGs)) are "zero touch." With a basic configuration, and upon reception of customer traffic (e.g., detection of activity on a Virtual Local Area Network (VLAN)), VLANs can be dynamically authenticated and created using information received from an AAA on central server, and so are the dynamic subscriber interfaces. In the service node case, there are new entities that may need to be created for signaling sessions towards access nodes, e.g., pseudowires. In addition, due to the nature of the Seamless MPLS architecture, it may be unknown or non-determined, a priori, which service nodes should serve a specific access node, as this is the nature of this mode of operation. The techniques of this disclosure give the flexibility to select the service node based on any criteria (new service node centralized for a specific service, for example), while maintaining the zero touch aspect of the operation.

The details of one or more examples are set forth in the accompanying drawings and the description below. Other features, objects, and advantages will be apparent from the description and drawings, and from the claims.

DETAILED DESCRIPTION

Figure 1:
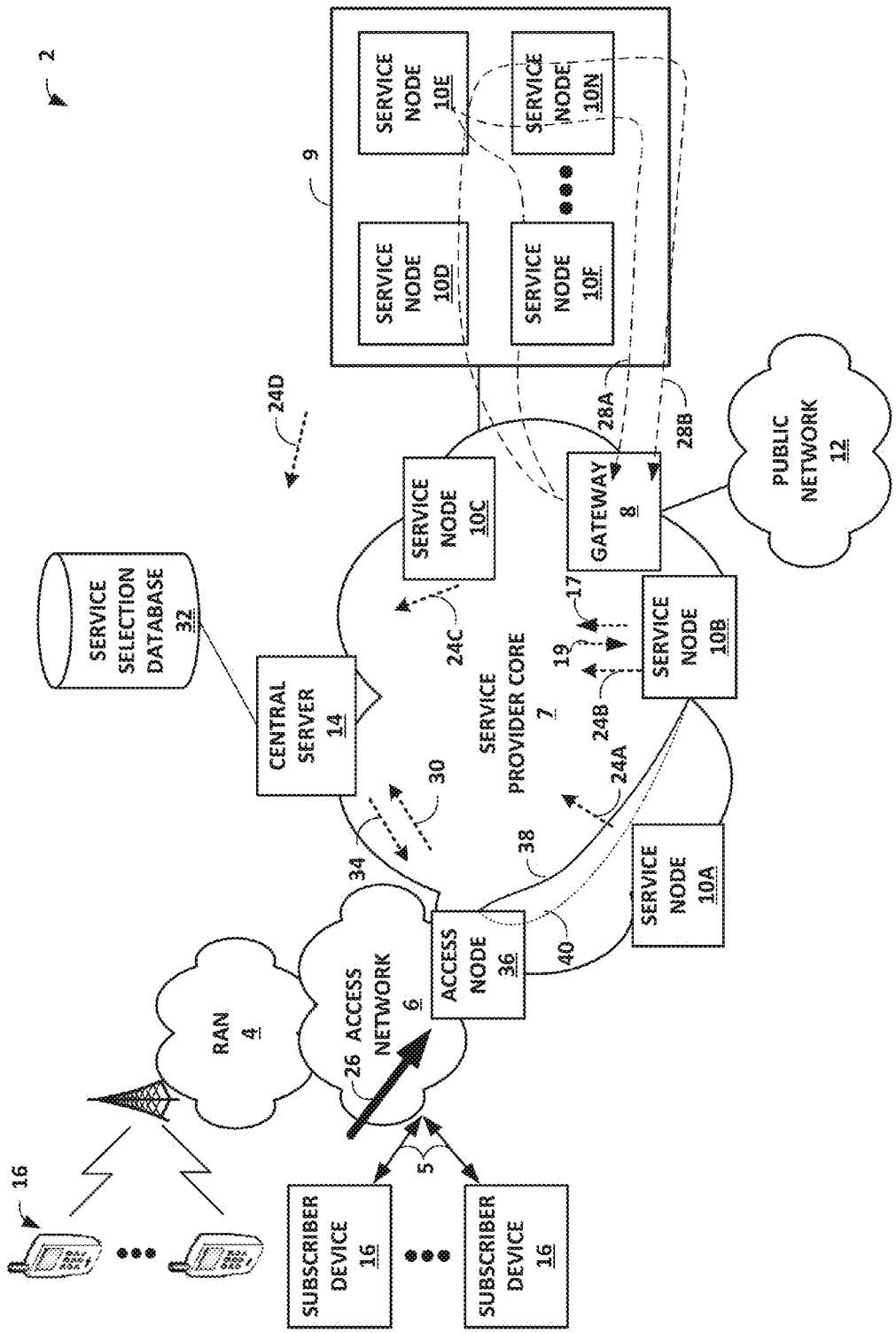
FIG. 1 is a block diagram illustrating an example network system in accordance with techniques described herein.

FIG. 1 is a block diagram illustrating an example network system in accordance with techniques described herein. The example network system of FIG. 1 includes a service provider network 2 that operates as a private network to provide packet-based network services to subscriber devices 16. That is, service provider network 2 provides authentication and establishment of network access for subscriber devices 16 such that a subscriber device may begin exchanging data packets with public network 12, which may be an internal or external packet-based network such as the Internet.

In the example of FIG. 1, service provider network 2 comprises access network 6 ("access network 6") that provides connectivity to public network 12 via service provider core network 7 and gateway 8. Service provider core network 7 and public network 12 provide packet-based services that are available for request and use by subscriber devices subscriber devices 16. As examples, core network 7 and/or public network 12 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various embodiments, public network 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of public network 12 services.

Subscriber devices 16 connect to gateway 8 via access network 6 to receive connectivity to subscriber services for applications hosted by subscriber devices 16. A subscriber may represent, for instance, an enterprise, a residential subscriber, or a mobile subscriber. Subscriber devices 16 may be, for example, personal computers, laptop computers or other types of computing device associated with subscribers. In addition, subscriber devices 16 may comprise mobile devices that access the data services of service provider network 2 via radio access network (RAN) 4. Example mobile subscriber devices include mobile telephones, laptop or desktop computers having, e.g., a 3G wireless card, wireless-capable netbooks, video game devices, pagers, smart phones, personal data assistants (PDAs) or the like. Each of subscriber devices 16 may run a variety of software applications, such as word processing and other office support software, web browsing software, software to support voice calls, video games, videoconferencing, and email, among others. Subscriber devices 16 connect to access network 6 via access links 5 that comprise wired and/or wireless communication link. The term "communication link," as used herein, comprises any form of transport medium, wired or wireless, and can include intermediate nodes such as network devices. Each of access links 5 may comprise, for instance, aspects of an asymmetric DSL network, WiMAX, a T-1 line, an Integrated Service Digital Network (ISDN), wired Ethernet, or a cellular radio link.

A network service provider operates, or in some cases leases, elements of access network 6 to provide packet transport between subscriber devices 16 and gateway 8. Access network 6 represents a network that aggregates data traffic from one or more subscribers for transport to/from service provider core network 7 of the service provider. Access network 6 includes network nodes that execute communication protocols to transport control and user data to facilitate communication between subscriber devices 16 and gateway 8. Access network 6 may include a broadband access network, network, a wireless LAN, a public switched telephone network (PSTN), or other type of access network, and may include or otherwise provide connectivity for cellular access networks, such as radio access network (RAN) 4 of FIG. 1. Examples of include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

Service provider core network 7 (hereinafter, "core network 7") offers packet-based connectivity to subscriber devices 16 attached to access network 6 for accessing public network 12. Core network 7 may represent a public network that is owned and operated by a service provider to interconnect a plurality of networks, which may include access network 6. Core network 7 may implement Multi-Protocol Label Switching (MPLS) forwarding and in such instances may be referred to as an MPLS network or MPLS backbone. In some instances, core network 7 represents a plurality of interconnected autonomous systems, such as the Internet, that offers services from one or more service providers. Public network 12 may represent an edge network coupled to core network 7, e.g., by a customer edge device such as customer edge switch or router. Public network 12 may include a data center.

In examples of network 2 that include a wireline/broadband access network, gateway 8 may represent a Broadband Network Gateway (BNG), a Broadband Remote Access Server (BRAS), MPLS Provider Edge (PE) router, core router or gateway, or a Cable Modem Termination System (CMTS), for instance. In examples of network 2 that include a cellular access network as access network 6, gateway 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to gateway 8 may be implemented in a switch, service card or other network element or component. In some examples, gateway 8 may itself be a service node.

A network service provider that administers at least parts of network 2 typically offers services to subscribers associated with devices, e.g., subscriber devices 16, that access the service provider network. Services offered may include, for example, traditional Internet access, Voice-over-Internet Protocol (VoIP), video and multimedia services, and security services. As described above with respect to access network 6, core network 7 may support multiple types of access network infrastructures that connect to service provider network access gateways to provide access to the offered services. In some instances, network system may include subscriber devices 16 that attach to multiple different access networks 6 having varying architectures.

In general, any one or more of subscriber devices 16 may request authorization and data services by sending a session request to gateway 8. In turn, gateway 8 may access central server 14 to authenticate the subscriber device requesting network access. Central server 14 may include functionality of an Authentication, Authorization and Accounting (AAA) server, as described in further detail below. Once authenticated, any of subscriber devices 16 may send subscriber data traffic toward service provider core network 7 in order to access and receive services provided by public network 12, and such packets may traverse gateway 8 as part of at least one packet flow.

Flows 26 illustrated in FIG. 1 represent one or more upstream packet flows from any one or more subscriber devices 16 and directed to public network 12. The term "packet flow," "traffic flow," or simply "flow" refers to a set of packets originating from a particular source device and sent to a particular destination device. A single flow of packets, in either the upstream (sourced by one of subscriber devices 16) or downstream (destined for one of subscriber devices 16) direction, may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. Moreover, a subscriber device 16 may originate multiple packet flows upon authenticating to service provider network 2 and establishing a communication session for receiving data services.

As described herein, service provider core network 7 includes service nodes 10A-10C. Each of service nodes may represent a Broadband Network Gateway (BNG), a Broadband Remote Access Server (BRAS), MPLS Provider Edge (PE) router, core router, gateway router, or a Cable Modem Termination System (CMTS), for instance. In examples of network 2 that include a cellular access network as access network 6, each of service nodes 10A-10C may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to each of service nodes 10A-10C may be implemented in a switch, service card or other network element or component.

As described herein, service provider network also includes a services complex 9 having a cluster of service nodes 10D-10N that provide an execution environment for the network services. In some examples, each of service nodes 10D-10N represents a service instance. Collectively, service nodes 10A-10N are referred to herein as "service nodes 10." Each of service nodes 10 may apply one or more services. As examples, service nodes 10 may apply firewall and security services, carrier grade network address translation (CG-NAT), media optimization (voice/video), IPSec/VPN services, deep packet inspection (DPI), HTTP filtering, counting, accounting, charging, and/or load balancing of packet flows, or other types of services applied to network traffic.

Although illustrated as part of a services complex 9, which may represent a data center, service nodes 10D-10N may, for instance, be network devices coupled by one or more switches or virtual switches of core network 7. In one example, each of service nodes 10D-10N may run as virtual machines in a virtual compute environment. Moreover, the compute environment may comprise a scalable cluster of general computing devices, such as x86 processor-based servers. As another example, service nodes 10D-10N may comprise a combination of general purpose computing devices and special purpose appliances. As virtualized, individual network services provided by service nodes 10D-10N can scale just as in a modern data center, through the allocation of virtualized memory, processor utilization, storage and network policies, as well as horizontally by adding additional load-balanced virtual machines.

As shown in FIG. 1, gateway 8 can steer individual subscriber packet flows 26 through defined sets of services provided by service nodes 10D-10N. That is, in some examples, each subscriber packet flow may be forwarded through a particular ordered combination of services provided by service nodes 10D-10N, each ordered set being referred to herein as a "service chain." In the example of FIG. 1, one or more subscriber packet flows 26 are directed along a first service chain 28A and, therefore, receive services applied by service nodes 10F, 10E and 10N, in that order. Similarly, one or more subscriber packet flows 26 are directed along a second service chain 28B and, therefore, receive services applied by service nodes 10D, 10E and 10N. In other examples, subscriber packet flows 26 may be directed along a service chain that includes any of service nodes 10.

In this way, subscriber flows 26 may be processed by service nodes 10 as the packets flow between access network 6 and public network 12 according to service chains configured by the service provider. In the illustrated example, service chain 28A identifies the ordered set of service nodes 10F, 10E and 10N according to the listed ordering. Service chain 28B identifies the ordered set of service nodes 10D, 10E and 10N. Accordingly, packet flows 26 processed according to service chain 28A follow a service path that traverses service nodes 10F, 10E, and finally service node 10N as the terminal node for the service chain 28A. A particular service node 10 may support multiple service chains. In this example, service node 10E supports both of service chains 28A, 28B.

Once processed at a terminal node of the service chain, i.e., the last service node 10 to apply services to packets flowing along a particular service path, the terminal node may direct the traffic back to gateway 8 for further processing and/or forwarding to public network 12. For example, traffic engineered service paths may start and terminate with gateway 8.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. The arrows denoted as service chains 28A, 28B illustrate respective paths taken by packet flows mapped to the service chains 28A or 28B. For example, a given subscriber may be associated with a particular service profile, which in turn is mapped to a service tunnel associated with service chain 28A. Similarly, another subscriber may be associated with a different service profile, which in turn is mapped to a service tunnel associated with service chain 28B. In some examples, gateway 8 may, after authenticating and establishing access sessions for the subscribers, direct packet flows for the subscribers along the appropriate service tunnels, thereby causing service complex 9 to apply the requisite ordered services for the given subscriber.

In some examples, service nodes 10 may implement service chains 28A, 28B using internally configured forwarding state that directs packets of the packet flow long the service chains 28A, 28B for processing according to the identified set of service nodes 10. Such forwarding state may specify tunnel interfaces for tunneling between service nodes 10 using network tunnels such as Internet Protocol (IP) or Generic Route Encapsulation (GRE) tunnels, or by using Virtual Local Area Networks (VLANs), Multiprotocol Label Switching (MPLS) techniques, and so forth. In some instances, real or virtual switches, routers or other network elements that interconnect service nodes 10 may be configured to direct packet flow to the service nodes 10 according to service chains 28A, 28B.

In some examples, central server 14 may be a software-defined networking (SDN) controller that provides a high-level controller for configuring and managing routing and switching infrastructure of service provider network 2 (e.g., gateway 8, core network 7 and service nodes 10). In some instances, central server 14 manages deployment of virtual machines within the operating environment of value-added services complex 9. For example, central server 14 may interact with gateway 8 to specify service chain 28A, 28B information. For example, the service chain information provided by central server 14 may specify any combination and ordering of value-added services provided by service nodes 10, traffic engineering information (e.g., labels or next hops) for tunneling or otherwise transporting (e.g., MPLS or IP tunnels) packet flows along service paths, rate limits, Type Of Service (TOS) markings or packet classifiers that specify criteria for matching packet flows to a particular service chain 28A, 28B. Further example details of an SDN controller are described in PCT International Patent Application PCT/US13/44378, filed Jun. 5, 2013, the entire contents of which are incorporated herein by reference.

Central server 14 may be, in some examples, a Remote Authentication Dial In User Service (RADIUS) server that provides centralized Authentication, Authorization, and Accounting (AAA) management. The RADIUS protocol is described in Carl Rigney et al., "Remote Authentication Dial In User Server (RADIUS)," Network Working Group of the Internet Engineering Task Force (IETF), Request for Comments 2865, June 2000, which is incorporated by reference herein in its entirety (referred to hereinafter as "RFC 2865"). Authorization data in the RADIUS server are stored as vendor-specific attributes (VSAs). In another example, central server 14 may be a Lightweight Directory Access Protocol (LDAP) server.

One of the key advantages of Seamless MPLS is to turn the whole network into a Cloud of reachable resources. However, this also means that there is flexibility in allocating resources to services, access nodes and/or subscribers. That flexibility needs to be articulated into some solution. When an access node (AN), e.g., access node 36, needs to establish a pseudowire towards a service node (SN), such as one of service nodes 10, for one or more subscribers, such as subscriber devices 16, in the absence of the techniques of this disclosure the AN must be explicitly configured (e.g., by an administrator) which SN is to be used as the destination. However, the conditions that determine which is the appropriate SN may change over time, for example there may be new services whose SN gets deployed in a centralized way, specialized SNs, overload conditions that require another SN to be used, or failure scenarios that require other more remote SNs to be used. All those are situations that would require some "intelligent" decision about which is the appropriate SN. Likewise, within a SN, it also needs to take an "intra-SN" decision about which specific service resource it will need to use (i.e., which PFE). PFEs may be at a different degree of utilization. There is, therefore, a "SN selection" and "PFE selection" within a service node. Both fall into what we referred as "Service Resource Selection". The "SN Selection" is relevant for the AN (e.g., OLT, DSLAM). The "PFE Selection" is relevant within the SN (e.g., BNG, PE). That decision can happen within the network element itself/ distributed, or can happen in an external/centralized entity. In either case, for that decision to happen, the "decision maker" needs to have the necessary information.

In the example of FIG. 1, service nodes 10 may communicate service resource information to central server 14 to be stored by central server 14 in service selection database 32. The service resource information indicates information regarding service resources available on each of service nodes, such as types of services, and may also indicate capacity information, such as a number of packet forwarding engines (PFEs) in the respective service node 10, and how much processing capacity the PFEs each have remaining for applying services to additional traffic, for example. The service resource information can be expressed in a normalized fashion across the different service nodes 10. In some examples, each of service nodes 10 may send routing advertisements that include service resource information. A routing protocol, such as an interior gateway protocol (IGP) (e.g., IS-IS or OSPF) or the Border Gateway Protocol (BGP), for example, may be extended to include service resource information in route update messages. For example, service nodes 10 may send routing protocol update messages 24A-24D ("routing protocol update messages 24") to central server 14. In some examples, update messages 24 may be BGP update message that carry service resource information in network layer reachability information (NLRI) fields. Central server 14 receives the routing protocol update messages 24 and updates service selection database 32 with the service resource information from the routing protocol update messages 24.

In this manner, service nodes 10 can expose their service resources and capabilities, including the level of utilization of those service resources. In addition, service nodes 10 can update this information by sending further update messages 24 as the service resources are consumed or released. Whichever network element is configured to make decisions based on the service selection database has access to that information and can make the appropriate choices, such as selecting which service node to use for a session with the access node, which PFE within a service node to use for anchoring a pseudowire with an access node, which service node to use as backup if backup is needed, or which PFE to use as backup, for example.

The mechanism used to expose the service resources in this case may be, for example, the TE extensions of the IGP (OSPF-TE or ISIS-TE), or BGP-TE. Extensions to a routing protocol to advertise service resource information may be similar to those extensions made for advertising link-state information in BGP, for example. For examples of advertising link-state information in BGP, see H. Gredler, "Advertising Link-State Information in BGP," Inter-Domain Routing Internet-Draft, draft-gredler-bgp-to-01, July 2011, the entire contents of which are incorporated by reference herein.

Service provider core network 7 may comprise an Internet Protocol (IP) network that uses Multi-Protocol Label Switching (MPLS) mechanisms to encapsulate packets of various network protocols for transport across network 10. MPLS protocols, such as the Label Distribution Protocol (LDP) or the Resource Reservation Protocol with Traffic Engineering extensions (RSVP-TE), enable routers to establish specific paths through network 10, i.e., Label Switched Paths (LSPs). A set of packets to be forwarded in a same manner along a same LSP is referred to as a forwarding equivalence class (FEC). Typically, a FEC definition includes the IP address of the egress router of the LSP. Using MPLS mechanisms, data packets are assigned labels to identify the FEC to which the packets belong, and forwarding decisions are made for the data packets based on the labels. The labels are included in MPLS headers used to encapsulate the packets for transport along the LSP. In some examples, the labels are "stacked" to establish segmented LSP tunnels in which multiple LSPs are nested together in order to reach an egress router of the last LSP on the label stack. Label assignment in the MPLS architecture is described in more detail in Aggarwal, R., "MPLS Upstream Label Assignment and Context-Specific Label Space," RFC 5331, August 2008, the entire contents of which are incorporated by reference herein.

In network 7, network devices may use LDP to distribute labels to other routers along the hop-by-hop IGP paths to establish LSPs. More specifically, the routers may distribute LDP label mapping messages indicating assigned labels and associated FECs for the LSPs. Two routers that use LDP to exchange label mapping information are referred to as LDP peer routers. Directly connected neighbor routers may be LDP peer routers with a direct LDP session. In the case where non-neighbor routers want to be LDP peer routers, the non-neighbor routers may establish a targeted LDP session between them. For example, access node 36 and service node 10 may be LDP peer routers with a targeted LDP session 38. In the example of FIG. 1, service node 10B may distribute a LDP label mapping message to access node 36 along an IGP primary path to establish a targeted LDP session 38 between access node 36 and service node 10B, for example. More information on LDP is described in Anderson, L., "LDP Specification," RFC 5036, October 2007, the entire contents of which are incorporated by reference herein. More information on MPLS is described in Rosen, E., "Multiprotocol Label Switching Architecture," RFC 3031, January 2001, the entire contents of which are incorporated by reference herein.

Access node 36 may be, for example, an optical line terminal (OLT), a DLSAM, or other access node device. In some examples, in response to detecting one of various potential triggering events, such as receiving traffic associated with a newly provisioned customer line, access node 36 checks with central server 14 as to what access node 36 should do with the traffic received for the new customer line, e.g., by sending a request message 30 to central server 14. To request access to a service, a subscriber device connects to access node 36. Access node 36 is a RADIUS client configured to communicate with a central server 14 for the service provider network using the RADIUS protocol, access node 36 confirms that the subscriber device is authentic and is authorized to access the service by requesting the central server 14 to validate the access request from the subscriber device (e.g., by sending a RADIUS Authorization-Request message). For example, message 30 may be a RADIUS Authorization-Request message that access node 36 sends to central server 14, which may include additional information in vendor-specific attributes of the RADIUS access request that requests central server 14 to assign a service node to which access node 36 should establish a targeted LDP session. Upon validating an access request, the central server 14 responds to access node 36 with a RADIUS protocol message directing the access node 36 to accept the access request and establish a session enabling connectivity between the subscriber device and the service provider network for the requested service.

Access node 36 may receive a reply message 34 from central server 14 in response to the request message 30 indicating one of service nodes 10 to which access node 36 should establish a targeted LDP session for setting up a pseudowire for traffic associated with the new customer line. For example, after validating the RADIUS Authorization-Request message against user profile database (not shown) using the subscriber credentials, central server 14 may return a RADIUS Authorization-Accept message that includes a vendor-specific attribute (VSA) that specifies a particular service node 10 (such as service node 10B) to which to establish a targeted LDP session. Vendor-specific attributes are described in RFC 2865, referenced above.

Alternatively or additionally, a service node 10 may send a request message 30 to central server 14 requesting central server 14 to assign a service node to which the access node 36 should establish a targeted LDP session, and central server 14 may respond to the service node or directly to the access node with a reply message 34 assigning one of service nodes 10 to which the access node 36 should establish the targeted LDP session. The service node may send the request 30 in response to one or more triggering events, such as the service node receiving a label mapping message from the access node 36 attempting to establish a targeted LDP session with that service node. In some examples, the access node 36 may select the nearest service node, but this service node may send a request to the central server 14 to assign a service node (potentially the same or a different service node) that is appropriate in view of the service information in service selection database 32.

Central server 14 may check service selection database 32 in response to receiving the request message 30 from access node 36 or a service node 10, and central server 14 may determine that service node 10B should be assigned as the service node to which access node 36 should establish the targeted LDP session. For example, central server 14 may determine which service node 10 to assign based on requirements of particular services to be applied to the subscriber traffic, which may have been specified in the request message 30. For example, if a given service is needed for a particular amount of subscriber traffic, then central server 14 will assign a service node capable of providing the given service and having the required capacity.

If access node 36 does not already have a targeted LDP session established with the assigned service node 10B, access node 36 can initiate establishment of targeted LDP session 38 with service node 10B, after receiving the message 34 indicating the assigned service node. Once established, access node 36 and service node 10B may send and receive periodic targeted Hello messages with each other. Access node 10 may allocate a pseudowire label for a pseudowire and send a label binding to service node 10B in a label mapping message over targeted LDP session 38. Service node 10B receives the label mapping message and decodes the pseudowire label from the label mapping message.

In some examples, in response to detecting one of various potential triggering events, such as receiving a label mapping message with the pseudowire label from the access node 36, service node 10B may check with central server 14 to determine a particular internal forwarding component of service node 10B to which to anchor the pseudowire, e.g., by sending a request message 17 to central server 14. Service node 10B is a RADIUS client configured to communicate with central server 14 as a RADIUS server for the service provider network using the RADIUS protocol, and service node 10B confirms that the subscriber device is authentic and is authorized to access the service by requesting central server 14 to validate the access request from the subscriber device (e.g., by sending a RADIUS Authorization-Request message). For example, message 17 may be a RADIUS Authorization-Request message that service node 10B sends to central server 14, which may include additional information in vendor-specific attributes of the RADIUS access request that requests central server 14 to assign a particular internal forwarding component of service node 10B to which service node 10B should anchor the pseudowire. Upon validating an access request, central server 14 responds to service node 10B with a RADIUS protocol message 19 directing service node 10B to accept the access request and anchor pseudowire 40 between access node 36 and service node 10B to the assigned forwarding component of service node 10B, for enabling connectivity between the subscriber device and the service provider network for the requested service.

Service node 10B may receive a reply message 19 from central server 14 in response to the request message 17 indicating one of multiple packet forwarding engines (PFEs) of service node 10B to which service node 10B should anchor a pseudowire for traffic associated with the new customer line. For example, after validating the RADIUS Authorization-Request message against user profile database (not shown) using the subscriber credentials, central server 14 may return a RADIUS Authorization-Accept message that includes a vendor-specific attribute (VSA) that specifies a particular PFE of service node 10B to use.

For example, central server 14 may check service selection database 32 in response to receiving the request message 17 from service node 10B, and central server 14 may determine that a particular forwarding component of service node 10B should be assigned as the forwarding component to which service node 10B should anchor the pseudowire. For example, central server 14 may determine which internal forwarding component to assign based on requirements of particular services to be applied to the subscriber traffic, which may have been specified in the request message 17. For example, if a given service is needed for a particular amount of subscriber traffic, then central server 14 will assign a forwarding component capable of providing the given service and having the required capacity.

After determining an internal PFE to which to anchor the pseudowire 40 being established, service node 10B also allocates a pseudowire label for the pseudowire and sends a label binding to access node 36 in a label mapping message over targeted LDP session 38. Access node 36 receives the label mapping message and decodes the pseudowire label from the label mapping message. In this manner, access node 36 and service node 10B establish pseudowire 40.

In some examples, gateway 8 modifies packets of packet flows 26 as the gateway 8 steers the packets into appropriate service chains. For example, gateway 8 may prepend to each subscriber packet a traffic engineering header or label (e.g., an additional IP header or MPLS label) to form a "tunnel packet" in which the subscriber packet is encapsulated as a payload. At this time, gateway 8 selects the particular traffic engineering header based on the particular subscriber and, more specifically, selects the service chain to which the particular type of packet flow for the given subscriber is assigned. In other words, the processing of subscriber packet flows 26 by gateway 8 to steer the packet flows may in some examples be session-aware (i.e., based on the particular subscriber from which the packet flow originated) and may also be based on characteristics of the packet flow itself, e.g., type of flow (e.g., VoIP, HTTP, etc).

In this way, in some example aspects the techniques described herein can allow access node 36 and service nodes 10 to leverage the authorization process performed between themselves and central server 14, to obtain intelligent assignment of service resources. Different example embodiments may be implemented. For example, in some aspects access node 36 and/or service nodes 10 may access service selection database 32 directly and make service allocation decisions based on the service resource information aggregated there by central server 14.

The techniques of this disclosure can provide a mechanism to model (data model, format) the service resources available on a service node 10. This may turn into more detailed requirements depending on the type of service. A BNG may use Point-to-Point Protocol over Ethernet (PPPoE), or Dynamic Host Configuration Protocol (DHCP), for example. In some examples, service nodes 10 include some local logic, upon having visibility of a Service Selection Database, which determines which service resource to use. In some examples, this could be based on just a local database of the service node 10, as the PFE selection is an intra-SN decision.

In some examples, access node 36 includes some local logic to decide, upon having visibility of the Service Selection Database 32 (network wide), which determines which service node to use. In some examples, central server 14 makes decisions on the appropriate service resource to use, decisions on re-optimization, balancing, and so on, and central server 14 may either interface with a separate AAA server (not shown) upon receiving requests, or upon requests directly from an access node or service node by some other interface, e.g., a communications protocol such as Extensible Messaging and Presence Protocol (XMPP), for example.

To achieve the zero touch goal, for a subscriber to be served, there is more logical "infrastructure" that needs to be created. A targeted LDP session may provide a transport LSPs between AN and SN. In other examples, a transport LSP may be set up using RSVP-TE and some explicit actions may be required to keep the "zero touch." If pseudowire signaling sessions are based on BGP, and there are route reflectors, this may become just a one-time issue network wide, however, if targeted LDP is used, this requires an LDP session for every AN-SN pair that requires pseudowires, so this may require some relevant configuration effort and therefore some additional intelligence may be required to keep the network "zero touch." Customer traffic flows inside pseudowires between AN and SN and some explicit configuration/signaling is required for them to be activated. It is therefore necessary to embed some additional intelligence for the pseudowires to be created with a "zero touch" approach.

Figure 2:
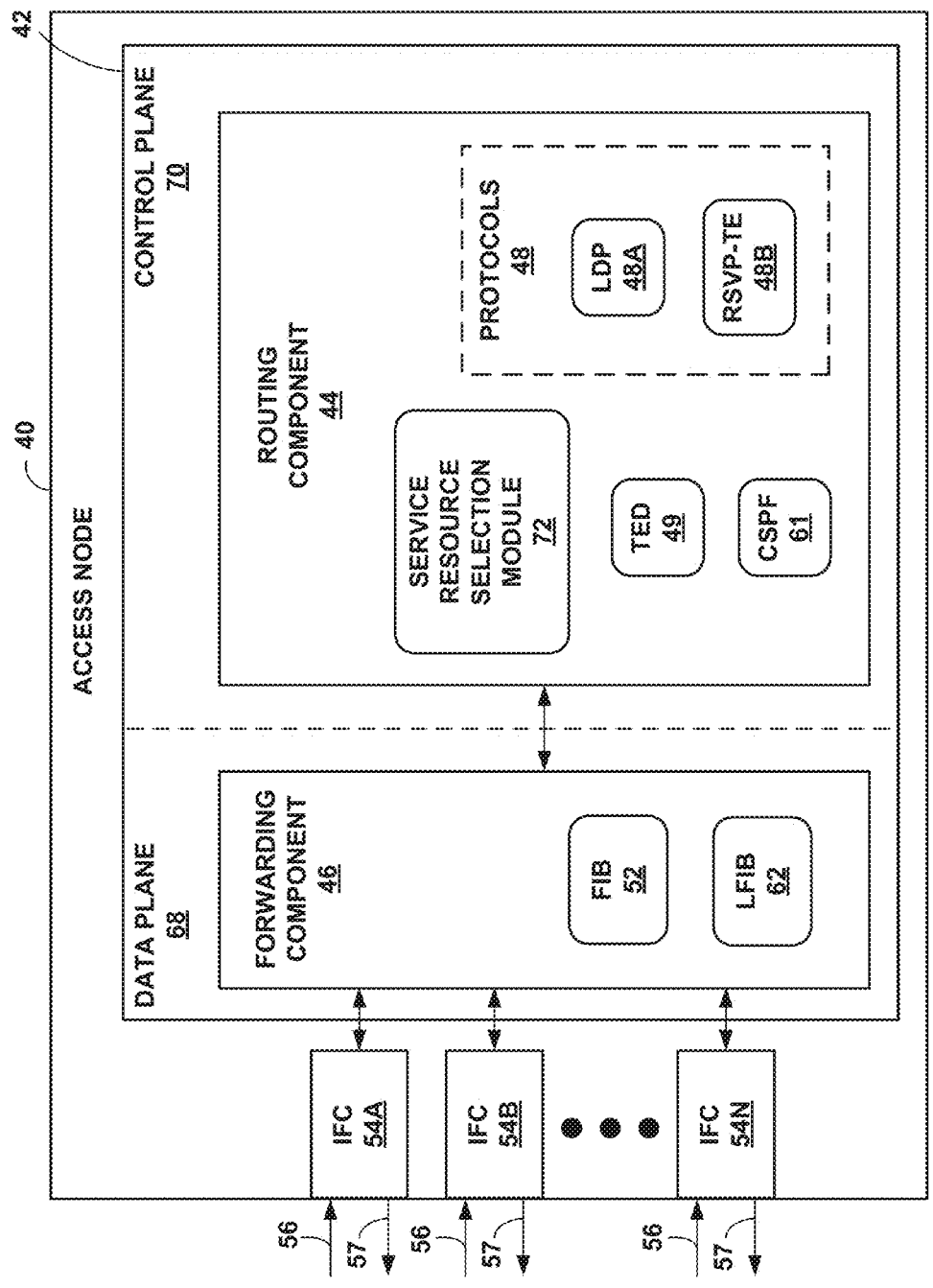
FIG. 2 is a block diagram illustrating an example access node network device configured to operate in accordance with the techniques of this disclosure.

FIG. 2 is a block diagram illustrating an example access node (AN) network device 40 configured to operate in accordance with the techniques of this disclosure. Access node 40 may represent access node 36 of FIG. 1, for example. In this example, access node 40 includes a control unit 42 that comprises a routing component 44 and a forwarding component 46. In addition, access node 40 includes a set of interface cards (IFCs) 54A-54N (collectively, "IFCs 54") for communicating packets via inbound links 56A-56N (collectively, "inbound links 56") and outbound links 57A-57N (collectively, "outbound links 57"). Access node 40 may also include a switch fabric (not shown) that couples IFCs 54 and forwarding component 46.

Based on FIB 52, forwarding component 46 in the data plane 68 forwards packets received from inbound links 52A-52N to outbound links 54A-54N that correspond to next hops associated with destinations of the packets. U.S. Pat. No. 7,184,437 provides details on an exemplary embodiment of a router that utilizes a radix tree for route resolution. The entire contents of U.S. Pat. No. 7,184,437 are incorporated herein by reference.

In one example, forwarding component 46 is a rich and dynamic shared forwarding plane, optionally distributed over a multi-chassis router. Moreover, forwarding component 46 may be provided by dedicated forwarding integrated circuits normally associated with high-end routing components of a network router.

Routing component 44 in the control plane 70 primarily provides an operating environment for one or more control plane protocols 48. In the example of FIG. 2, protocols 48 include Multiprotocol Label Switching (MPLS) protocols for allocation and distribution of labels for the LSPs, such as LDP 48A and RSVP-TE 48B. In some examples, RSVP-TE 45 may generate and maintain a traffic engineering database (TED) 49, including bandwidth reservations for paths associated with MPLS LSPs. Constrained Shortest Path First (CSPF) process 61 may compute a shortest path or paths for an MPLS LSP based on specified constraints and bandwidth availability information associated with the links within the network. As another example, Label Distribution Protocol (LDP) 48A may send and receive label mapping messages for establishing a LSP.

In the example of FIG. 2, access node 40 has a reduced control plane 70 that does not execute a routing protocol such as an interior gateway protocol (IGP) or Border Gateway Protocol (BGP). In some examples, routing component 44 may generate and program forwarding component 46 with FIB 52 that associates network destinations with specific next hops and corresponding interfaces ports of IFCs 50. Routing component 44 may generate FIB 52 in the form of a radix tree having leaf nodes that represent destinations within the network, for example. In other examples, forwarding component may receive updates to FIB 52 and label FIB (LFIB) 62 from a central controller, such as an SDN controller.

Access node 40 is capable to retrieve, for a user/ingress interface, upon initial reception of traffic, an indication of what access node 40 should do with the traffic. Service resource selection module 72 may, in some examples, include logic to decide which service node to use. For example, service resource selection module 72 may decide which of service nodes 10 to use based on information accessed at service selection database 32 (FIG. 1). In other examples, service resource selection module 72 receives information specifying which service node to use from a central server such as central server 14.

If the architecture used in the service provider network includes zero touch functionality for access node 40, there would be an additional set of requirements for the access node, as access node 40 would need to "react" upon new lines provisioned or traffic coming from the subscriber triggering both the creation of the interfaces as well as the signaling of the LDP sessions and/or pseudowire, if necessary, towards the right Service Node. Thus, in accordance with the techniques of this disclosure, access node 40 may include zero touch functionality such as VLAN/interface authentication into AAA via central server 14 upon receipt of subscriber packet, retrieving from the central server indication of the right Service Node to connect to, the capability to auto-initiate LDP sessions, and the capability to auto-initiate pseudowires.

Upon initially receiving subscriber traffic, for example, access node 40 can create a VLAN, apply a particular Quality of Service (QoS) profile, and initiate set up of a targeted LDP session and pseudowire or use an existing pseudowire, if available. Service resource selection module 72 can request from a RADIUS server or from another centralized element such as central server 14, an indication of the specific service node to which access node 40 should set up the pseudowire, based on certain constraints. Example constraints may include: Expected bandwidth for the pseudowire, Expected number of users sessions (when applicable: PPPOE, DHCP), Max latency acceptable, Type of redundancy required: (e.g., stateful, stateless, intra-chassis, inter-chassis), and Backup Service Node. For example, service resource selection module 72 may send a RADIUS authentication message that includes these constraints in vendor-specific attributes (VSAs). Service resource selection module 72 may receive from central server 14 a RADIUS message in reply confirming subscriber authentication and specifying a service node to use in VSAs.

In one embodiment, forwarding component 46 may comprise one or more dedicated processors, hardware, and/or computer-readable media storing instructions to perform the techniques described herein. The architecture of access node 40 illustrated in FIG. 2 is shown for example purposes only. In other embodiments, access node 40 may be configured in a variety of ways. In one embodiment, for example, control unit 42 and its corresponding functionality may be distributed within IFCs 54.

Control unit 42 may be implemented solely in software, or hardware, or may be implemented as a combination of software, hardware, or firmware. For example, control unit 42 may include one or more processors which execute software instructions. In that case, the various software modules of control unit 42 may comprise executable instructions stored on a computer-readable medium, such as computer memory or hard disk.

Figure 3:
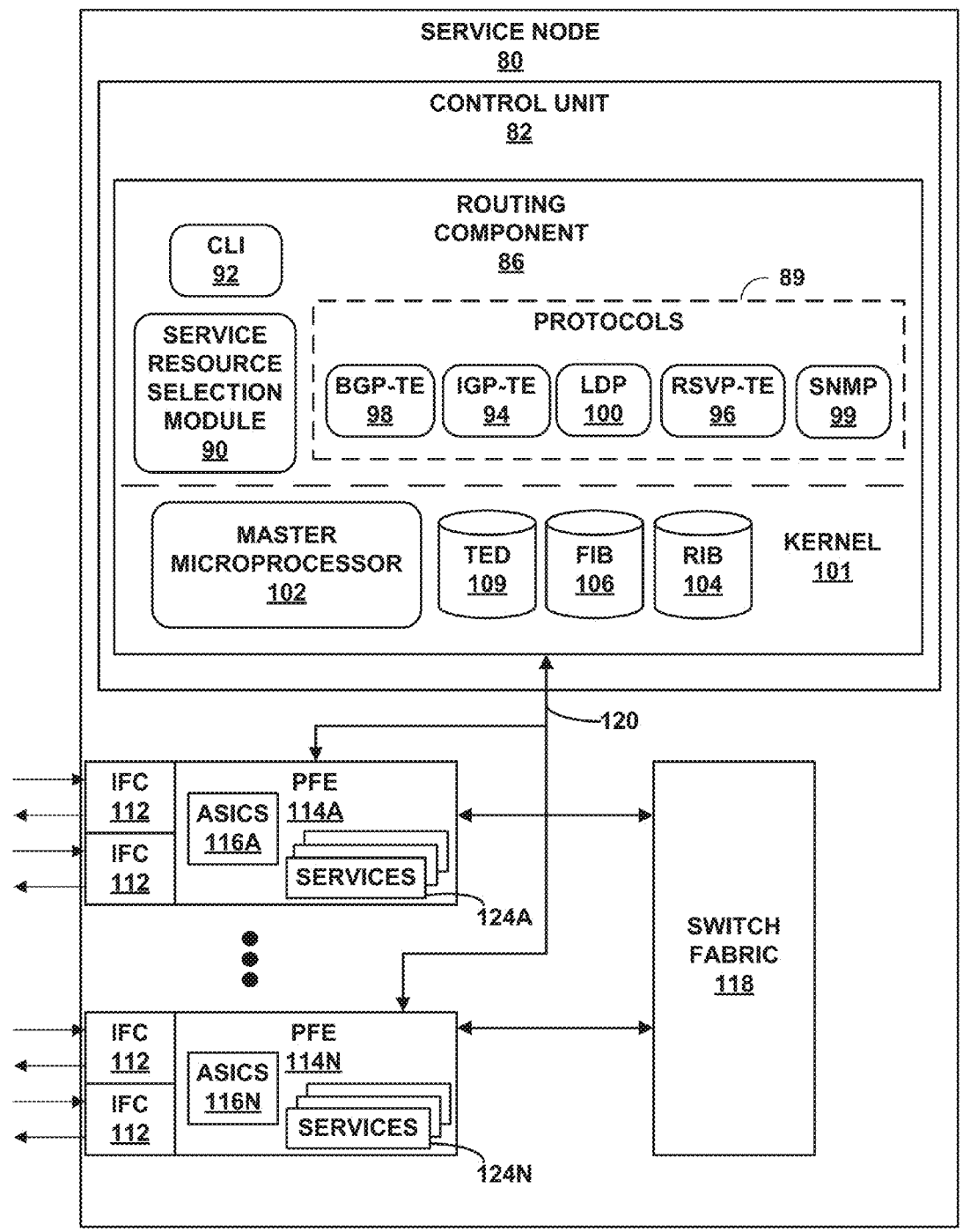
FIG. 3 is a block diagram illustrating an example service node (SN) network device configured to operate in accordance with the techniques of this disclosure.

FIG. 3 is a block diagram illustrating an example service node (SN) network device configured to operate in accordance with the techniques of this disclosure. Service node 80 may comprise any router in a network, such as SP network 2. In some examples, service node 80 may comprise a service node, gateway, an edge router, a core router or other device illustrated in FIG. 1 that applies network services.

In the example of FIG. 3, service node 80 includes control unit 82 in which routing component 86 provides control plane functionality for service node 80. Service node 80 also includes a plurality of packet-forwarding engines 114A-114N ("PFEs 114") and a switch fabric 118 that collectively provide a data plane for forwarding network traffic. PFEs 114 receive and send data packets via interface cards 112 ("IFCs 112"). In other embodiments, each of PFEs 114 may comprise more or fewer IFCs. Although not shown, PFEs 114 may each comprise a central processing unit (CPU) and a memory. In this example, routing component 86 is connected to each of PFEs 114 by a dedicated internal communication link 120. For example, dedicated link 120 may comprise a Gigabit Ethernet connection. Switch fabric 118 provides a high-speed interconnect for forwarding incoming data packets between PFEs 114 for transmission over a network. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

Routing component 86 provides an operating environment for execution of various protocols 89 that may comprise software processes having instructions executed by a computing environment. As described in further detail below, protocols 89 provide control plane functions for storing network topology in the form of routing tables or other structures, executing routing protocols to communicate with peer routing devices and maintain and update the routing tables, and providing management interface(s) to allow user access and configuration of service node 80. Control unit 82 provides an operating environment for routing component 86 and may be implemented solely in software, or hardware, or may be implemented as a combination of software, hardware or firmware. For example, control unit 82 may include one or more processors which execute software instructions. In that case, routing component 86 may include various software modules or daemons (e.g., one or more routing protocol processes, user interfaces and the like), and control unit 82 may include a computer-readable storage medium, such as computer memory or hard disk, for storing executable instructions.

Command line interface daemon 92 ("CLI 92") provides an interface by which an administrator or other management entity may modify the configuration of service node 80 using text-based commands. Simple Network Management Protocol daemon 99 ("SNMP 99") comprises an SNMP agent that receives SNMP commands from a management entity to set and retrieve configuration and management information for service node 80. Using CLI 92 and SNMP 99, one or more management entities may enable/disable and configure services, install routes, enable/disable and configure rate limiters, and configure interfaces, for example.

One or more routing protocols, such as IGP 94, maintains routing information in the form of routing information base (RIB) 104 that describes a topology of a network, and derives a forwarding information base (FIB) 106 in accordance with the routing information. In general, the routing information represents the overall topology of the network. IGP 94 interacts with kernel 101 (e.g., by way of API calls) to update RIB 104 based on routing protocol messages received by service node 80. RIB 104 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, FIB 106 is generated based on selection of certain routes within the network and maps packet key information (e.g., destination information and other select information from a packet header) to one or more specific next hops and ultimately to one or more specific output interface ports of IFCs 112. Routing component 86 may generate the FIB in the form of a radix tree having leaf nodes that represent destinations within the network. Details on an example embodiment of a router that utilizes a radix tree for route resolution are provided in U.S. Pat. No. 7,184,437, the entire contents of which are incorporated herein by reference.

Routing component 86 also provides an operating environment of one or more traffic engineering protocols to establish tunnels for forwarding subscriber packets through the ordered set of service nodes associated with different service chains. For example, RSVP-TE 96 may execute the Resource Reservation Protocol with Traffic Engineering extensions to exchange traffic engineering (TE) information, such as MPLS labels for enabling label-based packet forwarding. As another example, routing component 86 may use GRE or IP-based tunneling protocols to establish traffic engineered tunnels. Routing component 86 may maintain, for example, a traffic engineering database (TED) 109 to store the traffic engineering data.

Routing component 86 communicates data representative of a software copy of the FIB 106 into each of PFEs 114 to control forwarding of traffic within the data plane. This allows the software FIB stored in memory (e.g., RAM) in each of PFEs 114 to be updated without degrading packet-forwarding performance of service node 80. In some instances, routing component 86 may derive separate and different software FIBs for each respective PFEs 114. In addition, one or more of PFEs 114 include application-specific integrated circuits (ASICs 116) that PFEs 114 program with a hardware-copy of the FIB based on the software FIBs (i.e., hardware versions of the software FIBs) copied to each respective PFE 114.

For example, kernel 101 executes on master microprocessor 102 and may comprise, for example, a UNIX operating system derivative such as Linux or Berkeley Software Distribution (BSD). Kernel 101 processes kernel calls from IGP 94 and RSVP-TE 96 to generate forwarding information in the form of FIB 106 based on the network topology represented in RIB 104, i.e., performs route resolution and path selection. Typically, kernel 101 generates FIB 106 in the form of radix or other lookup trees to map packet information (e.g., header information having destination information and/or a label stack) to next hops and ultimately to interface ports of interface cards associated with respective PFEs 114. FIB 106 may associate, for example, network destinations with specific next hops and corresponding IFCs 112. For MPLS-related traffic forwarding, FIB 106 stores, for a given FEC, label information that includes an incoming label, an outgoing label, and a next hop for a packet.

Master microprocessor 102 executing kernel 101 programs PFEs 114 to install copies of the FIB 106. Microprocessor 102 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, ASICs 116 are microcode-controlled chipsets (i.e., forwarding circuits) programmably configured by a slave microprocessor executing on each of PFEs 114. When forwarding packets, control logic with each ASIC 116 traverses the forwarding information (FIB 106) received from routing component 86 and, upon reaching a FIB entry for the packet (e.g., a leaf node), microcode-implemented control logic 56 automatically selects a forwarding next hop and processes the packets in accordance with the operations defined within the next hop. In this way, ASICs 116 of PFEs 114 process packets by performing a series of operations on each packet over respective internal packet forwarding paths as the packets traverse the internal architecture of service node 80. Operations may be performed, for example, on each packet based on any of a corresponding ingress interface, an ingress PFE 114, an egress PFE 30, an egress interface or other components of service node 80 to which the packet is directed prior to egress, such as one or more service cards. PFEs 114 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of PFEs 114 arranges forwarding structures as next hop data that can be chained together as a series of "hops" along an internal packet forwarding path for the network device. In many instances, the forwarding structures perform lookup operations within internal memory of ASICs 116, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 116 determines the manner in which a packet is forwarded or otherwise processed by PFEs 114 from its input interface on one of IFCs 112 to its output interface on one of IFCs 112.

In general, kernel 101 may generate FIB 106 and thereby program ASICs 116 to store forwarding structures associated with each service chain. For example, ASICs 116 may be configured with forwarding information that specifies traffic engineering information, such as IP header information or MPLS labels, as well as operations for causing programmable ASICs 116 to encapsulate subscriber packets in accordance with the forwarding information. In this way, ASICs 116 may process subscriber packets to select particular service paths for each packet and encapsulate the subscriber packets in accordance with the selected service paths. Routing component 86 may generate RIB 104 and FIB 106 to associate subscriber packet flows with particular service paths based on one or more service profiles associated with each subscriber, as may be received from an Authentication, Authorization and Accounting (AAA) server, a policy controller, SDN controller or other network element.

Services 124A-124N ("services 124") applied by PFEs 114, respectively, may include one or more services such as firewall and security services, carrier grade network address translation (CG-NAT), media optimization (voice/video), Internet Protocol Security (IPSec) or Virtual Private Network (VPN) services, deep packet inspection (DPI), hyper-text transport protocol (HTTP) filtering, counting, accounting, charging, and/or load balancing of packet flows, or other types of services applied to network traffic.

Service resource selection module 90 and BGP-TE module 98 coordinate to advertise service resource information to the SSD, such as information about capacity of PFEs 114 and identification of services provided by the different ones PFEs 114. For example, service resource selection module 90 may advertise information such as a number of queues maintained by PFEs 114, an amount of available memory of PFES 114, and other metrics that relate to the availability and capacity of PFEs 114 for application of services to subscriber traffic. Control unit 202 also executes BGP-TE module 98 to peer with BGP speakers and BGP listeners to exchange routing information, including SSD NLRI in accordance with techniques described herein. That is, routing component 86 executes BGP-TE module 98 to advertise service resource information about the service node, such as by using an SSD NLRI in attributes (e.g., MP_REACH_NLRI) of BGP UPDATE messages 24 (FIG. 1). BGP-TE module 98 may refresh this information at the SSD at a configured time interval by sending a new BGP update message, and/or may send a new BGP update message when there has been some change in availability of PFE resources (e.g., due to a new reservation being made).

In some examples, service node 80 may be configured for Targeted LDP session auto-sensing, i.e., to set up an LDP session without local configuration upon reception of LDP session request signaling messages. LDP module 100 can receive an LDP label mapping message from an access node sent to initiate establishment of a targeted LDP session. Alternatively, RSVP-TE module 96 can receive a RESV request for setting up an RSVP-TE LSP. As described herein, the creation of the targeted LDP session or other LSP may trigger some Authentication, Authorization and Accounting (AAA) process where the session is "authenticated" and the appropriate parameters/attributes received from central server 14 using new service resource VSAs. LDP module 100 or RSVP-TE module 96 can communicate with service resource selection module 90 to initiate sending a RADIUS message as described herein.

As described herein, service node 80 may be configured for LDP pseudowire auto-sensing, i.e., to set up a pseudowire without local configuration upon reception of the pseudowire request signaling messages within an established LDP session. For example, service node 80 may be configured for triggering the creation on the local side of the pseudowire based on the received pseudowire signaling packets. The received pseudowire signaling packets may indicate a pseudowire identifier (PW-id) and an IP address of the requesting access node. As described herein, the creation of a pseudowire may be based on some AAA process where the pseudowire is "authenticated" and the appropriate parameters/attributes received from central server 14 using new VSAs.

In accordance with the techniques described herein, service resource selection module 90 is capable to, upon reception of a signaling request either for a LDP session or a pseudowire, send a message requesting information from the central server as to what the service node 80 should do with the request. For example, service resource selection module 90 may query the central server via a RADIUS message for instructions to authenticate and create an LDP session, or instructions to authenticate and create pseudowires upon reception of signaling requests from an access node. Service resource selection module 90 may build the RADIUS message using information contained in the pseudowire signaling message, such as the PW-id.

In response to the RADIUS request message, service resource selection module 90 may receive instructions specifying a PFE 114 to which service node 80 should anchor a pseudowire, and service characteristics (e.g., whether to provide redundancy). The central server's RADIUS/LDAP feature may have access to information about how many subscriber devices are behind an OLT or DSLAM access node, and so the central server knows how many subscribers are likely to be able to send traffic through the pseudowire, and can load balance the requests appropriately across different PFEs, for example. After anchoring the pseudowire to a given PFE according to the instructions received from the central server, service resource selection module 90 can then update the service resources available and expose the updated information to the rest of the network (e.g., via extended BGP).

In some examples, service resource selection module 90 may itself include logic to decide which service resource to use. For example, service resource selection module 90 may decide which of PFEs 114 to use based on information accessed at service selection database 32 (FIG. 1). In some examples, service resource selection module 90 may maintain an internal data structure (not shown) indicating service resource information about PFEs 114 and services 124, and may use this for determining which PFE to use. In other examples, as described above, service resource selection module 90 receives information specifying which service resource to use (e.g., which of PFEs 114) from a central server such as central server 14.

In some examples, service node 80 may use the techniques described herein in the context of service chaining. For example, service node 80 may receive from central server 14 an indication of a next service node to which to set up another pseudowire, and the process may repeat for each service node and service in the service chain.

The architecture of service node 80 illustrated in FIG. 3 is shown for example purposes only. This disclosure is not limited to this architecture. In other examples, service node 80 may be configured in a variety of ways. In one example, some of the functionally of control unit 82 may be distributed within IFCs 34. Control unit 82 may be implemented solely in software, or hardware, or may be implemented as a combination of software, hardware, or firmware. For example, control unit 82 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Control unit 82 may further include one or more processors which execute software instructions stored on a computer readable storage medium, such as random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media. In some instances, the computer-readable storage medium may include instructions that cause a programmable processor to perform the techniques described herein.

Figure 4:
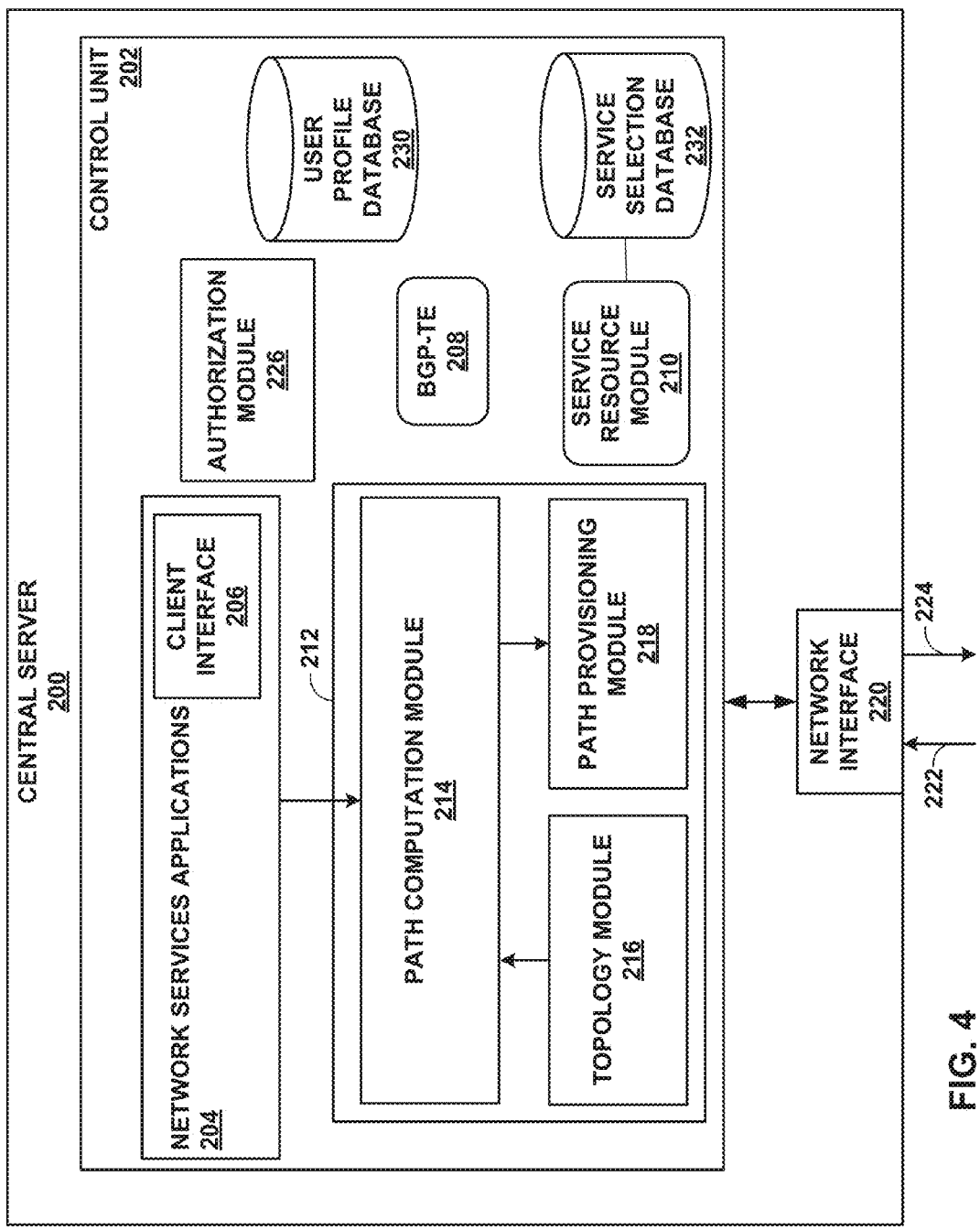
FIG. 4 is a block diagram illustrating an example central server network device in accordance with the techniques of this disclosure.

FIG. 4 is a block diagram illustrating an example central server network device in accordance with the techniques of this disclosure. Central server 200 may include aspects of one or more of a network controller, an Authentication, Authorization and Accounting (AAA) server, a policy controller, or SDN controller, for example, and may represent an example instance of central server 14 of FIG. 1.

Central server 200 includes a control unit 202 coupled to a network interface 220 to exchange packets with other network devices by inbound link 222 and outbound link 224. Control unit 202 may include one or more processors (not shown in FIG. 4) that execute software instructions, such as those used to define a software or computer program, stored to a computer-readable storage medium (again, not shown in FIG. 4), such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively or additionally, control unit 202 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 202 provides an operating environment for network services applications 204, path computation element 212, RADIUS module 226, LDAP module 228, BGP-TE module 208, and service resource module 210. In one example, these modules may be implemented as one or more processes executing on one or more virtual machines of one or more servers. That is, while generally illustrated and described as executing on a single central server 200, aspects of these modules may be delegated to other computing devices.

Network services applications 204 represent one or more processes that provide services to clients of a service provider network that includes central server 200 to manage connectivity in an aggregation domain (alternatively referred to as the "path computation domain") according to techniques of this disclosure. Network services applications 204 may provide, for instance, include Voice-over-IP (VoIP), Video-on-Demand (VOD), bulk transport, walled/open garden, IP Mobility Subsystem (IMS) and other mobility services, and Internet services to clients of the service provider network. Network services applications 204 use services provided by path computation element 212, such as node management, session management, and policy enforcement. Each of network services applications 204 may include client interface 206 by which one or more client applications request services. Client interface 206 may represent a command line interface (CLI) or graphical user interface (GUI), for instance. Client 206 may also, or alternatively, provide an application programming interface (API) such as a web service to client applications.

Network services applications 204 issue path requests to path computation element 212 to request paths in a path computation domain controlled by central server 200. For example, a path request may include a required bandwidth or other constraint and two endpoints representing an access node and an edge node or service node that communicate over the path computation domain managed by central server 200. Path requests may further specify time/date during which paths must be operational and CoS parameters (for instance, bandwidth required per class for certain paths).

Path computation element 212 accepts path requests from network services applications 204 to establish paths between the endpoints over the path computation domain. Paths may be requested for different times and dates and with disparate bandwidth requirements. Path computation element 212 reconciling path requests from network services applications 204 to multiplex requested paths onto the path computation domain based on requested path parameters and anticipated network resource availability.

To intelligently compute and establish paths through the path computation domain, path computation element 212 includes topology module 216 to receive topology information describing available resources of the path computation domain, including access, aggregation, and edge nodes, interfaces thereof, and interconnecting communication links.

Path computation module 214 of path computation element 212 computes requested paths through the path computation domain. In general, paths are unidirectional. Upon computing paths, path computation module 214 schedules the paths for provisioning by path provisioning module 218. A computed path includes path information usable by path provisioning module 218 to establish the path in the network. Provisioning a path may require path validation prior to committing the path to provide for packet transport.

Control unit 202 also executes Border Gateway Protocol with Traffic Engineering extensions (BGP-TE) module 208 to peer with BGP speakers and BGP listeners to exchange routing information, including service selection data (SSD) NLRI in accordance with techniques described herein. BGP-TE module 208 receives advertised service resource information in BGP UPDATE messages 24 (FIG. 1) issued by BGP peers that incorporate the SSD NLRI capability described herein. BGP-TE module 208 decodes SSD NLRI and stores service resource information from the SSD NLRI to service selection database 232. BGP-TE module 208 and BGP peers may perform a capability exchange (e.g., mutual advertisement) as part of the peering process to determine respective SSD NLRI capabilities of the BGP peers.

Network service providers typically deploy one or more servers to manage authentication, authorization, and accounting (AAA) functionality for networks that offer services to one or more subscribers. The protocol most commonly used by the servers to communicate with clients is the Remote Authentication Dial In User Service (RADIUS) protocol. In the example of FIG. 4, AAA functionality may be incorporated in central server 200 in the form of authorization module 226, which maintains a user profile database 230. User profile database 230 may include, for example, subscriber login credentials and other user profile information for subscribers. In other examples, central server 200 may not include AAA functionality but may request AAA operations from an external AAA server.

Upon receipt of a RADIUS Authorization-Request message (e.g., received from an access node or a service node), authorization module 226 confirms that subscriber device is authentic and is authorized to access the service, with reference to user profile database 230. Upon validating an access request, the RADIUS server responds to the requesting device with a RADIUS protocol message directing the requesting device to accept the access request and establish a session or pseudowire enabling connectivity between the subscriber device and the service provider network for the requested service. For example, after validating the RADIUS Authorization-Request message against user profile database 230 using the subscriber credentials, authorization module 226 returns a RADIUS Authorization-Accept message that includes a vendor-specific attribute (VSA) that specifies which service resource to use (e.g., which service node or PFE). Service resource module 210 may determine which service resource to use based on service selection database 232. In some examples, service selection database 232 may be external to central server 200. Authorization module 226 may cooperate with service resource module 210 to determine what service resource information to include within the VSAs of the reply message.

Figure 5:
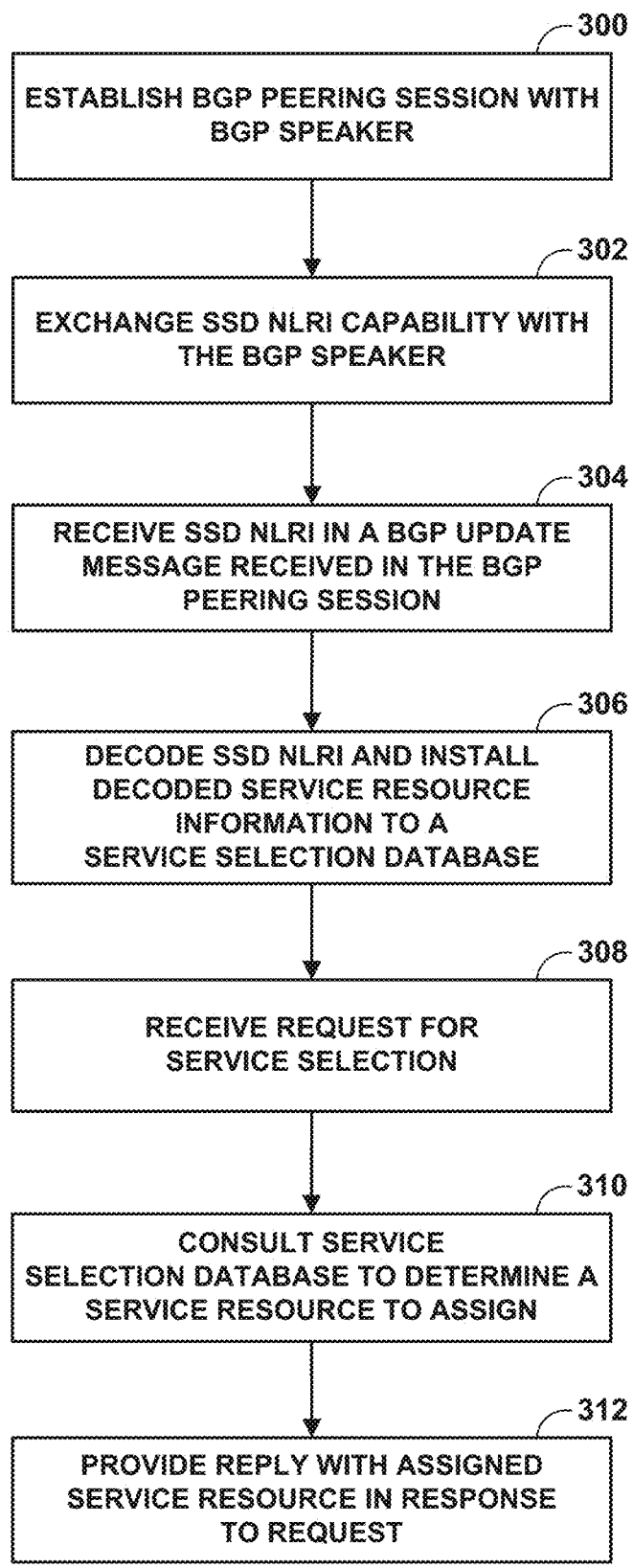
FIG. 5 is a flowchart illustrating an example mode of operation of a central server network device in accordance with the techniques of this disclosure.

FIG. 5 is a flowchart illustrating an example mode of operation of a central server network device in accordance with the techniques of this disclosure. While described with respect to central server 200 of FIG. 4, the techniques may applicable to other network devices, such as central server 14 of FIG. 1.

A routing protocol such as BGP-TE module 208 executes on central server 200 to establish a BGP peering session with a BGP speaker (e.g., another network device such as one of service nodes 10 of FIG. 1) (300). As part of establishing the BGP peering session, BGP-TE module 208 and the BGP speaker may exchange an SSD NLRI capability value to indicate to one another a mutual ability to originate and/or receive SSD NLRI in BGP UPDATE messages (302).

BGP-TE module 208 receives, from the BGP speaker in the BGP peering session, a BGP UPDATE message that includes an SSD NLRI (304). BGP-TE module 208 decodes the SSD NLRI to identify service resource information, such as information about the service node, including characteristics of one or more forwarding components of the service node, for example. BGP-TE module 208 installs the service resource information to service selection database 232 (306). Subsequently, central server 200 receives a request for service assignment, which may be included in an authentication request (e.g., a RADIUS message) (308). The request may specify requirements of the subscriber traffic to be serviced, such as particular services required to be applied to the subscriber traffic, amount of subscriber traffic expected, and the like. In response to receiving the request, service resource module 210 checks service selection database 232 and determines, based on the service resource information of service selection database 232, a service resource to assign that satisfies the requirements of the request (310). For example, service resource module 210 can assign a particular service node 10 or PFE within a service node 10 that is capable of providing the particular services needed for the subscriber traffic. Service resource module 210 then sends a reply providing information regarding the determined service resource, in response to the request (312). The information may include a destination address for a service node or a PFE, for example.

Figure 6:
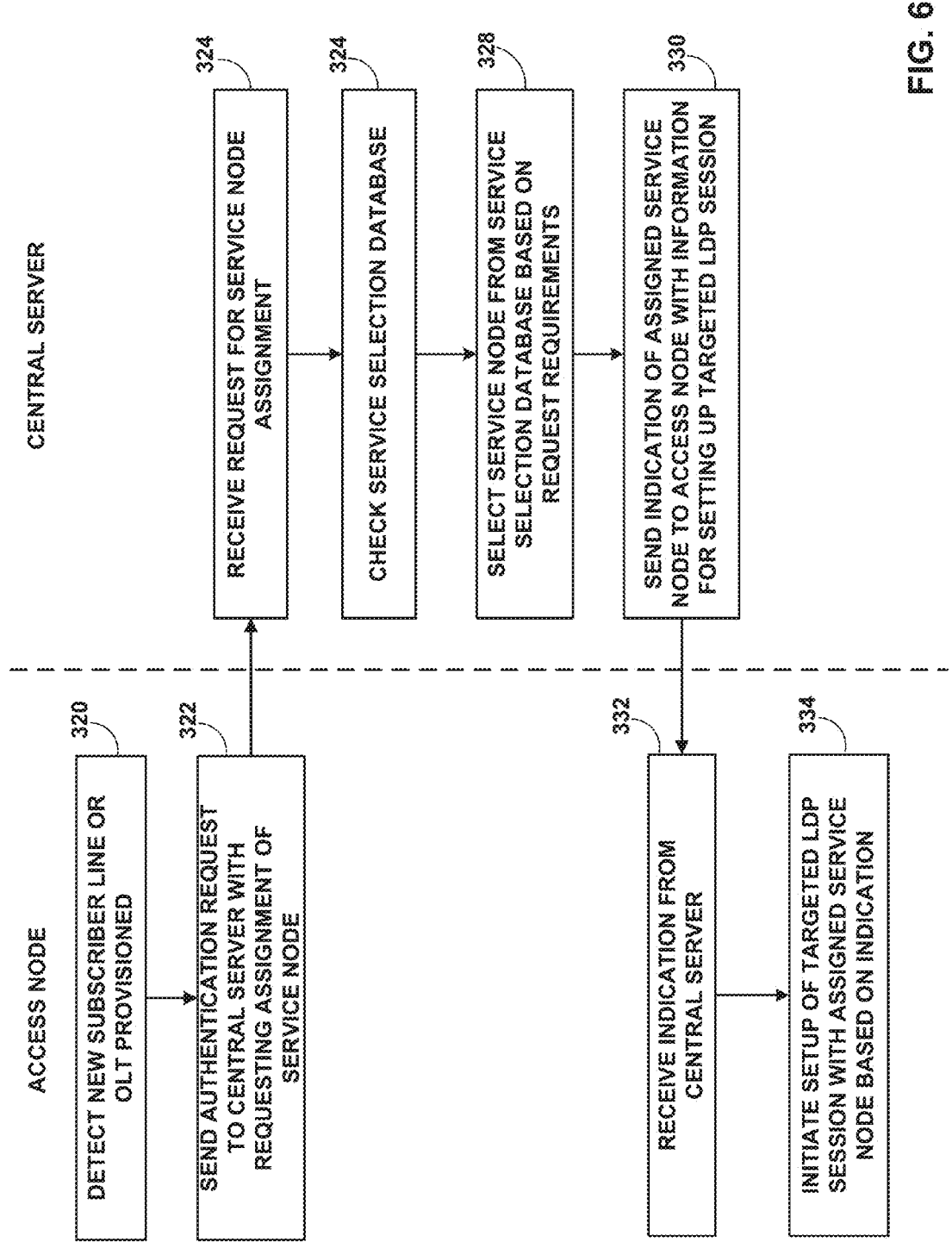
FIGS. 6 and 7 are flowcharts illustrating example operation of network devices in accordance with the techniques of this disclosure.

FIG. 6 is a flowchart illustrating example operation of network devices in accordance with the techniques of this disclosure. FIG. 6 will be described with reference to FIGS. 1-4 for purposes of example. For example, FIG. 6 refers to an access node network device and a central server, which in one example may be access node 36 and central server 14 of FIG. 1, respectively.

When the access node detects that a new resource has been provisioned (e.g., a new subscriber line or OLT) (320), the access node may send a request to a central server to request an assignment of which service node in the network to use for the newly provisioned resource (322). In some examples, the request may indicate one or more constraints for the service node requested. The central server receives this request for a service node assignment (324), and checks the SSD to determine which service node to assign based at least in part on the constraints indicated in the request (326). The central server selects the service node based on the SSD and the indicated constraints (328). In some examples, the central server may use a selection algorithm that takes into account the various constraints and characteristics of the candidate service nodes. The central server sends a message that includes an indication of the assigned service node to the access node (330). In some examples, the message also includes information for the access node to use in setting up a targeted LDP session. The central server may update the SSD based on the assignment of the service node. The access node receives the message from the central server (332), and initiates setup of the targeted LDP session with the assigned service node based on the information in the message from the central server (334).

Figure 7:
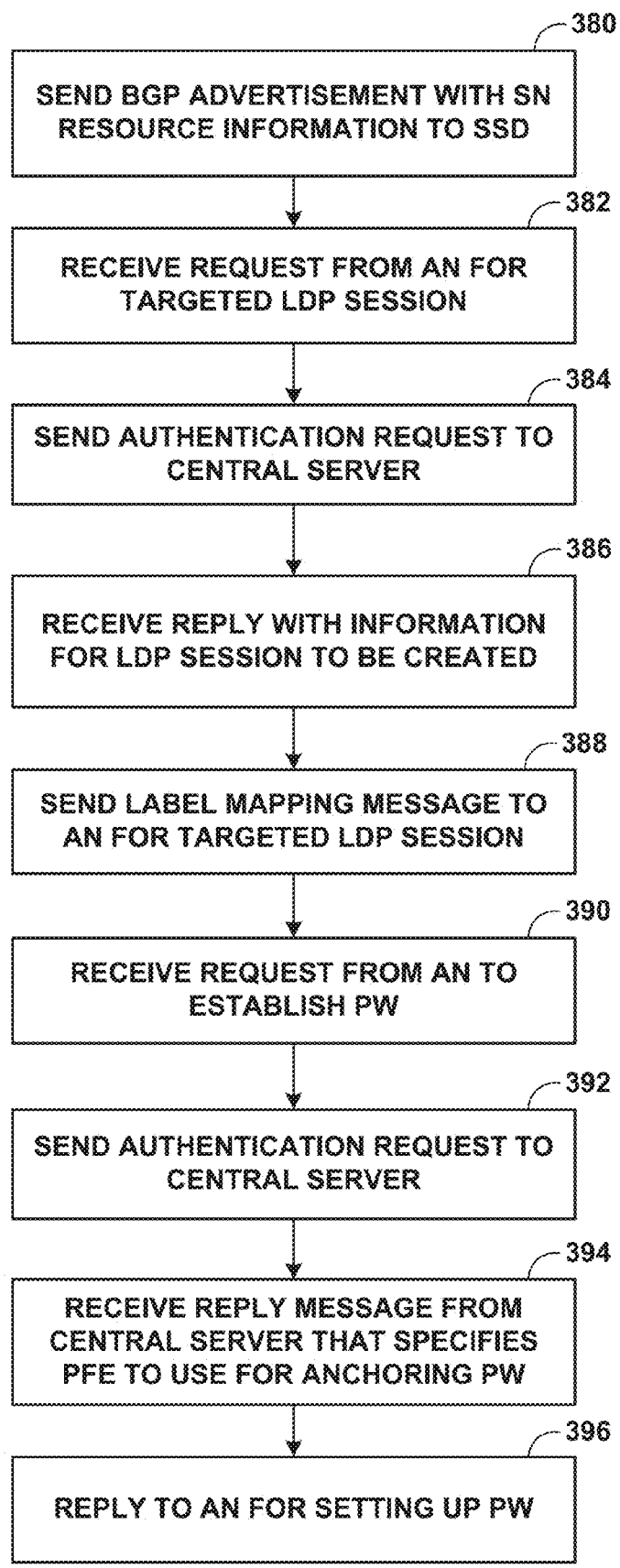

FIG. 7 is a flowchart illustrating example operation of network devices in accordance with the techniques of this disclosure. FIG. 7 will be described with reference to FIGS. 1-4 for purposes of example. For example, FIG. 7 refers to a service node network device, which in one example may be one of service nodes 10 of FIG. 1, respectively.

The service node sends a routing protocol advertisement to the SSD with service resource information associated with the service node (380). For example, the routing protocol advertisement may be a BGP advertisement, where BGP has been extended to allow for advertising service resource information. The service resource information may include information about one or more PFEs of the service node, for example. At some point, the service node receives a request from an access node for a targeted LDP session (382). In response to receiving the request, the service node sends a message to the central server requesting assignment of a service node for the targeted LDP session (384). The message may be an authentication message (e.g., in accordance with the RADIUS protocol) that also requests subscriber authentication. The service node receives from the central server a message (e.g., a RADIUS message including a VSA) with service resource information for the targeted LDP session to be created (386). In some examples, the RADIUS message may be an authentication reply message that confirms subscriber authentication, and also includes a VSA specifying the service resource information. The central server may assign the requesting service node, or a different service node. If the central server assigns the requesting service node, then that service node can then proceed to complete setup of the targeted LDP session with the access node, such as by sending an LDP label mapping message to the access node (388). The label mapping message may be generated based on information that was specified in the RADIUS VSA received from the central server. If a service node other than the requesting service node is assigned, then the central server may send a reply message directly to the access node with information for the targeted LDP session to be created.

The service node may also receive a request from the access node to establish a pseudowire with a service node (390). In response to receiving the request from the access node, in some examples the service node may send an inquiry to the central server to learn the PFE of the service node to which the service node should anchor the pseudowire (392). The service node may receive a RADIUS message having a VSA indicating which PFE the service node should use for anchoring the pseudowire (394). The service node can then proceed to complete establishment of the pseudowire between the PFE and the access node, such as by sending a communication to the access node (396).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
receiving, by a service node, a request from an access node to establish a pseudowire to be used for sending subscriber traffic from the access node to the service node for application of services to the subscriber traffic at the service node;
in response to receiving the request, sending a request message from the service node to a central requesting both subscriber authentication and assignment of one of a plurality of forwarding components internal to the service node to which to anchor the pseudowire;
receiving, by the service node and from the central server, a Remote Authentication Dial In User Service (RADIUS) authentication message in response to the request message, wherein the RADIUS authentication message confirms subscriber authentication and indicates a forwarding component internal to the service node to which the service node should anchor the pseudowire;
in response to receiving the RADIUS authentication message, automatically establishing the pseudowire between the access node and the service node; and
anchoring the pseudowire to the forwarding component indicated by the authentication message, the anchoring comprising allocating a pseudowire label for the pseudowire and sending a label binding to the access node via a targeted label distribution protocol (LDP) session between the access node and the service node.

2. The method of claim 1, further comprising:
by the service node, sending a routing protocol message to the central server to advertise service resource information, wherein the service resource information comprises information specifying capacity of each of the plurality of forwarding components of the service node.

3. The method of claim 2, wherein sending a routing protocol message comprises sending a Border Gateway Protocol (BGP) update message, wherein the service resource information is included as network layer reachability information (NLRI) of the BGP update message.

4. The method of claim 2, further comprising after receiving the RADIUS authentication message and by the service node, sending a second routing protocol message to the central server to advertise updated service resource information specifying the capacity of at least one of the plurality of forwarding components as updated based on the indication of the forwarding component to which the service node should anchor the pseudowire.

5. The method of claim 1, wherein the indication of the forwarding component is included in a vendor-specific attribute (VSA) of the RADIUS message.

6. The method of claim 1, wherein the RADIUS authentication message specifies the forwarding component as a primary forwarding component, and wherein the RADIUS authentication message further specifies a backup forwarding component to use in case the primary forwarding component is unavailable.

7. The method of claim 1, wherein the request from the service node specifies one or more required characteristics of the forwarding component for which assignment is requested.

8. The method of claim 7, wherein the required characteristics comprise a type of service that needs to be applied to the subscriber traffic.

9. A method comprising:
receiving, at a central Remote Authentication Dial In User Service (RADIUS) server, a RADIUS request from a network device requesting both subscriber authentication and assignment of one of a plurality of service nodes in a network to which to establish a targeted label distribution protocol (LDP) session between an access node and the assigned one of the plurality of service nodes for transporting subscriber traffic;
in response to receiving the RADIUS request and by the central RADIUS server, assigning a service node based on a service selection database containing service resource information associated with the plurality of service nodes, wherein the access node and the assigned service node are non-neighbor routers;
and outputting an authentication message from the central RADIUS server to the requesting network device in response to the RADIUS request message, wherein the authentication message confirms subscriber authentication and indicates the assigned service node to which to establish the targeted LDP session between the access node and the assigned service node.

10. The method of claim 9, further comprising:
by the central server, receiving a request message from the assigned service node requesting both subscriber authentication and assignment of one of a plurality of forwarding components of the assigned service node to which to anchor a pseudowire;
by the central server, in response to receiving the request, assigning one of the plurality of forwarding components based on the service selection database, wherein the service selection database includes service resource information associated with the plurality of forwarding components; and
by the central server, outputting an authentication message to the assigned service node in response to the request message, wherein the authentication message confirms subscriber authentication and indicates the assigned forwarding component of the service node to which the service node should anchor the pseudowire.

11. The method of claim 9, wherein the network device is the access node, wherein receiving the RADIUS request comprises receiving the RADIUS request from the access node in response to the access node detecting a new subscriber line to be provisioned.

12. The method of claim 9, wherein the network device is one of the service nodes, wherein receiving the RADIUS request comprises receiving the RADIUS request from the service node in response to the service node receiving a message from the access node initiating setup of the targeted LDP session.

13. The method of claim 9, wherein the request specifies one or more required characteristics of the service node for which assignment is requested.

14. The method of claim 13, wherein the required characteristics comprise a type of service that needs to be applied to subscriber traffic.

15. The method of claim 9, further comprising:
by the central server, performing subscriber authentication by checking subscriber credentials in a user profile database.

16. The method of claim 9, further comprising:
receiving routing protocol messages from each of the plurality of service nodes, wherein each of the routing protocol messages advertises service resource information about the respective service node; and
updating the service selection database based on the service resource information of the received routing protocol messages.

17. The method of claim 9, further comprising after assigning the service node, updating the service selection database to reflect the assignment of the service node.

18. A service node network device comprising:
a hardware-based processor:
a plurality of forwarding components;
an interface operable to receive a request from an access node to establish a pseudowire to be used for sending subscriber traffic from the access node to the service node for application of services to the subscriber traffic at the service node;
a service resource selection module operable by the processor to, in response to receiving the request, send a request message from the service node to a central server requesting both subscriber authentication and assignment of one of the plurality of forwarding components of the service node to which to anchor the pseudowire, and receive, from the central server, a Remote Authentication Dial In User Service (RADIUS) authentication message in response to the request message, wherein the RADIUS authentication message confirms subscriber authentication and indicates a forwarding component of the plurality of forwarding components to which the service node should anchor the pseudowire; and
a routing component operable to, in response to receiving the RADIUS authentication message, automatically establish the pseudowire between the access node and the service node;
and anchor the pseudowire to the forwarding component indicated by the RADIUS authentication message, the anchoring comprising allocating a pseudowire label for the pseudowire and sending a label binding to the access node via a targeted label distribution protocol (LDP) session between the access node and the service node.

19. The service node of claim 18, wherein the routing component is operable to send a routing protocol message to the central server to advertise service resource information, wherein the service resource information comprises information specifying capacity of each of the plurality of forwarding components of the service node.

20. The service node of claim 19, wherein the routing protocol message comprises a Border Gateway Protocol (BGP) update message, wherein the service resource information is included as network layer reachability information (NLRI) of the BGP update message.

21. The service node of claim 18, wherein the indication of the forwarding component is included in a vendor-specific attribute (VSA) of the RADIUS message.

22. The service node of claim 18, wherein the request from the service node specifies one or more required characteristics of the forwarding component for which assignment is requested, wherein the required characteristics comprise a type of service that needs to be applied to the subscriber traffic.

23. The service node of claim 18, wherein each of the plurality of forwarding components comprises an integrated circuit and a memory for application of the services to the subscriber traffic.

24. The service node of claim 23, wherein the integrated circuit comprises a central processing unit (CPU).

25. A central Remote Authentication Dial In User Service (RADIUS) server comprising:

a hardware-based processor:
an interface operable to receive a RADIUS request from a network device requesting both subscriber authentication and assignment of one of a plurality of service nodes in a network to which to establish a targeted label distribution protocol (LDP) session between an access node and the assigned one of the plurality of service nodes for transporting subscriber traffic;
a service resource module operable by the processor to, in response to receiving the RADIUS request, assign a service node based on a service selection database containing service resource information associated with the plurality of service nodes, wherein the access node and the assigned service node are non-neighbor routers; and
an authorization module operable by the processor to output an authentication message from the central server to the requesting network device in response to the RADIUS request message, wherein the authentication message confirms subscriber authentication and indicates the assigned service node to which to establish the targeted LDP session between the access node and the assigned service node.

26. The central server of claim 25, wherein the interface is operable to receive a request message from the assigned service node requesting both subscriber authentication and assignment of one of a plurality of forwarding components of the assigned service node to which to anchor a pseudowire, wherein the service resource module is operable to, in response to receiving the request, assign one of the plurality of forwarding components based on the service selection database, wherein the service selection database includes service resource information associated with the plurality of forwarding components, and
wherein the authorization module is operable to output an authentication message to the assigned service node in response to the request message, wherein the authentication message confirms subscriber authentication and indicates the assigned forwarding component of the service node to which the service node should anchor the pseudowire.

27. The central server of claim 25, wherein the request from the service node specifies one or more required characteristics of the forwarding component for which assignment is requested, wherein the required characteristics comprise a type of service that needs to be applied to the subscriber traffic.

28. A computer-readable storage medium comprising instructions for causing a programmable processor to:
receive a request at a service node from an access node to establish a pseudowire to be used for sending subscriber traffic from the access node to the service node for application of services to the subscriber traffic at the service node;
in response to receiving the request, send a request message from the service node to a central server requesting both subscriber authentication and assignment of one of a plurality of forwarding components internal to the service node to which to anchor the pseudowire;
receive, from the central server, a Remote Authentication Dial In User Service (RADIUS) authentication message in response to the request message, wherein the RADIUS authentication message confirms subscriber authentication and indicates a forwarding component internal to the service node to which the service node should anchor the pseudowire;
in response to receiving the RADIUS authentication message, automatically establish the pseudowire between the access node and the service node; and
anchor the pseudowire to the forwarding component indicated by the RADIUS authentication message, the anchoring comprising allocating a pseudowire label for the pseudowire and sending a label binding to the access node via a targeted label distribution protocol (LDP) session between the access node and the service node.

* * * * *